(12) United States Patent
Heo

(10) Patent No.: US 11,126,588 B1
(45) Date of Patent: Sep. 21, 2021

(54) RISC PROCESSOR HAVING SPECIALIZED REGISTERS

(71) Applicant: SHENZHEN GOODIX TECHNOLOGY CO., LTD., Shenzhen (CN)

(72) Inventor: Jaehoon Heo, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/941,499

(22) Filed: Jul. 28, 2020

(51) Int. Cl.
  *G06F 15/82* (2006.01)
  *G06F 9/30* (2018.01)

(52) U.S. Cl.
  CPC ............ *G06F 15/82* (2013.01); *G06F 9/3016* (2013.01); *G06F 9/30101* (2013.01)

(58) Field of Classification Search
  None
  See application file for complete search history.

(56) References Cited

U.S. PATENT DOCUMENTS

| | | | | |
|---|---|---|---|---|
| 5,168,573 A * | 12/1992 | Fossum | ................. | G06F 9/3012 712/4 |
| 2004/0193837 A1 * | 9/2004 | Devaney | ............. | G06F 9/30141 712/3 |
| 2006/0095735 A1 * | 5/2006 | Prokopenko | .......... | G06F 9/3012 712/218 |
| 2007/0239970 A1 * | 10/2007 | Liao | ...................... | G06F 9/3012 712/225 |
| 2009/0106341 A1 * | 4/2009 | Al Adnani | .......... | G06F 15/7867 708/404 |
| 2010/0199072 A1 * | 8/2010 | Craske | ................ | G06F 9/30141 712/208 |
| 2011/0219207 A1 * | 9/2011 | Suh | ........................... | G06F 9/22 712/7 |
| 2012/0260061 A1 * | 10/2012 | Reid | .................... | G06F 9/30036 712/3 |
| 2013/0297043 A1 * | 11/2013 | Choi | ................ | H03K 19/17752 700/3 |
| 2015/0121047 A1 * | 4/2015 | Bradbury | ............ | G06F 9/30112 712/226 |
| 2018/0329868 A1 * | 11/2018 | Chen | .................... | G06F 9/30036 |
| 2019/0384606 A1 * | 12/2019 | Panda | .................. | G06F 9/3891 |

* cited by examiner

*Primary Examiner* — Eric Coleman
(74) *Attorney, Agent, or Firm* — Kilpatrick Townsend & Stockton LLP

(57) ABSTRACT

A processor circuit is disclosed. The processor circuit includes a data path block circuit configured to perform a data path operation to generate one or more results. The processor circuit also includes a data register files circuit, having a first register file, where the first register file has a first quantity of read and write ports. The data register files circuit also includes a second register file, where the second register file has a second different quantity of read and write ports. The processor circuit also includes an instruction decoder circuit configured to provide an operation signal to the data path block circuit, where the operation signal identifies a particular data path operation to be performed by the data path block circuit and identifies one or more read ports of the data register files circuit for retrieving data encoding the first and second operands.

20 Claims, 4 Drawing Sheets

RISC PROCESSOR HAVING SPECIALIZED REGISTERS

CROSS-REFERENCE TO RELATED APPLICATIONS

This application is related to U.S. patent application Ser. No. 16/941,485 titled RISC PROCESSOR HAVING SPECIALIZED DATAPATH FOR SPECIALIZED REGISTERS, filed herewith, the contents of which are incorporated herein by reference in its entirety for all purposes.

TECHNICAL FIELD

The subject matter described herein relates to a RISC processor architecture, and more particularly to a RISC processor architecture having specialized registers.

BACKGROUND

RISC processors typically have a number of registers in register files which act as temporary memory storage locations for calculations performed by the processor. The register files are used for storing various types of calculation variables, and are therefore each configured to be used for each type of calculation variable. Because each register file is capable of being used for each type of calculation variable, each register file is implemented in a memory circuit having all of the features needed for each of the calculation variables. Accordingly, each register file requires a certain amount of die area. Register files requiring less die area are needed in the art.

One inventive aspect is a processor circuit. The processor circuit includes a data path block circuit configured to perform any of a plurality of data path operations to generate one or more results based on first and second operands. The processor circuit also includes a data register files circuit, having a first register file, where the first register file includes a first plurality of registers, and a first quantity of read and write ports. The data register files circuit also includes a second register file, where the second register file includes a second plurality of registers, and a second quantity of read and write ports. The first quantity of read and write ports is different from the second quantity of read and write ports. The processor circuit also includes an instruction decoder circuit configured to provide an operation signal to the data path block circuit, where the operation signal identifies a particular data path operation to be performed by the data path block circuit and identifies one or more read ports of the data register files circuit for retrieving data encoding the first and second operands.

In some embodiments, in response to the operation signal, the data path block circuit is configured to retrieve first and second operand data signals from the identified read ports, where the first and second operand data signals respectively encode the first and second operands.

In some embodiments, in response to the operation signal, the data path block circuit is configured to perform the identified particular data path operation on the first and second operands to generate the one or more results.

In some embodiments, the operation signal identifies one or more write ports, and the data path block circuit is configured to provide the one or more results to the identified write ports.

In some embodiments, the instruction decoder circuit is configured to receive a data path instruction from a memory, where the data path instruction encodes the particular data path operation, one or more operation result registers within the data register files circuit where the one or more results of the particular data path operation are to be stored, and first and second operand registers within the data register files circuit which store data to be used as the first and second operands.

In some embodiments, the first operand is in the first register file and the second operand is in the second register file.

In some embodiments, at least one of the one or more operation result registers is in the first register file, and at least one of the first operand register and the second operand register is in the second register file.

In some embodiments, the instruction decoder circuit is configured to provide a register signal for the data register files circuit, and the register signal identifies the one or more operation result registers, one or more write ports for the one or more operation result registers, the first and second operand registers, and first and second read ports for the first and second operand registers.

In some embodiments, based on the register signal, the data register files circuit is configured to provide data stored in the first and second operand registers to the first and second read ports.

In some embodiments, based on the register signal, the data register files circuit is configured to read data from the one or more write ports for the one or more operation result registers to the one or more operation result registers.

Another inventive aspect is a method of making a processor circuit. The method includes forming a data path block circuit, where the data path block circuit is configured to perform any of a plurality of data path operations to generate one or more results based on first and second operands. The method also includes forming a data register files circuit by forming a first register file, where the first register file includes a first plurality of registers, and a first quantity of read and write ports, and by forming a second register file, where the second register file includes a second plurality of registers, and a second quantity of read and write ports, where the first quantity of read and write ports is different from the second quantity of read and write ports. The method also includes forming an instruction decoder circuit configured to provide an operation signal to the data path block circuit, where the operation signal identifies a particular data path operation to be performed by the data path block circuit and identifies one or more read ports of the data register files circuit for retrieving data encoding the first and second operands.

In some embodiments, in response to the operation signal, the data path block circuit is configured to retrieve first and second operand data signals from the identified read ports, where the first and second operand data signals respectively encode the first and second operands.

In some embodiments, in response to the operation signal, the data path block circuit is configured to perform the identified particular data path operation on the first and second operands to generate the one or more results.

In some embodiments, the operation signal identifies one or more write ports, and the data path block circuit is configured to provide the one or more results to the identified write ports.

In some embodiments, the instruction decoder circuit is configured to receive a data path instruction from a memory, where the data path instruction encodes the particular data path operation, one or more operation result registers within the data register files circuit where the one or more results of the particular data path operation are to be stored, and first and second operand registers within the data register files circuit which store data to be used as the first and second operands.

In some embodiments, the first operand is in the first register file and the second operand is in the second register file.

In some embodiments, at least one of the one or more operation result registers is in the first register file, and at least one of the first operand register and the second operand register is in the second register file.

In some embodiments, the instruction decoder circuit is configured to provide a register signal for the data register files circuit, where the register signal identifies the one or more operation result registers, one or more write ports for the one or more operation result registers, the first and second operand registers, and first and second read ports for the first and second operand registers.

In some embodiments, based on the register signal, the data register files circuit is configured to provide data stored in the first and second operand registers to the first and second read ports.

In some embodiments, based on the register signal, the data register files circuit is configured to read data from the one or more write ports for the one or more operation result registers to the one or more operation result registers.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

When practical, similar reference numbers denote similar structures, features, or elements.

DETAILED DESCRIPTION

Figure 1:
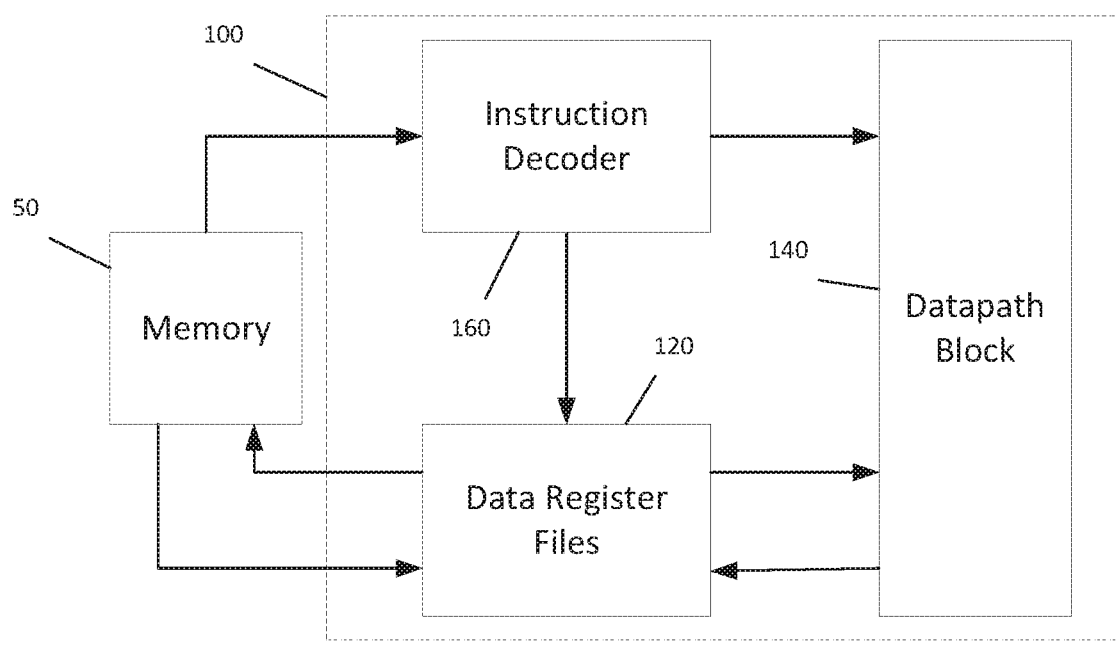
FIG. 1 is a schematic diagram of an embodiment of a processor circuit.

Particular embodiments of the invention are illustrated herein in conjunction with the drawings. Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Processor register files require a certain amount of circuit die area and a certain amount of power. Embodiments discussed herein disclose register files which use less circuit die area and less power than conventional register files.

Processors, such as RISC processors, use a LOAD/CALCULATE/STORE procedure for processing instructions, where data is LOADED into one or more registers, a CALCULATION is performed on the register data using a data path block of a datapath having multiple data path blocks, and calculation results from the data path block are STORED in one or more registers. Read and write access is provided to each register by read and write ports for both the memory and the data path blocks of the datapath. For an implementation, designers determine the number of registers and register files based on trade-offs between, for example, execution speed and circuit die area. In addition, designers determine a number of read and write ports for both the memory and the datapath to be used for the register files. Each register file requires a certain amount of circuit die area and a certain amount of power.

Embodiments discussed herein allow for the register files to use less circuit die area and less power than conventional register files. Embodiments have general purpose register files, that have a determined number of read and write ports for the memory and the datapath, and also has specialized registers, that use a different number of ports according to how each of the registers is to be used.

For example, some register files may be used as general purpose register files, which have a designed number of each port type. In addition, result variable register files may have two read ports and one write port, and constant variable register files may have one port and one write port. In some embodiments, other register files having other port configurations may be used. Because the result variable and constant variable registers use fewer ports, they use less area and less power. Therefore, using these specialized registers in the place of a number of general purpose registers uses less circuit die area and less power for the same number of registers.

Functionality of a processor circuit having data register files, an instruction decoder, and a data path block is discussed with reference to FIG. 1. Functionality of a processor circuit having data register files of particular port configurations, an instruction decoder, and a data path block is discussed with reference to each of FIGS. 2-4. Functionality of a processor circuit having data register files of differing port configurations, an instruction decoder, and a data path block is discussed with reference to FIG. 5. A method of manufacturing a processor circuit is discussed with reference to FIG. 6.

FIG. 1 is a schematic diagram of an embodiment of a processor circuit 100 interfacing with memory 50. Processor circuit 100 includes data register files circuit 120, data path block circuit 140, and instruction decoder circuit 160. Processor circuit 100 may be used as a portion of a central processing unit (CPU) having other processor circuits known to those of skill in the art. In some embodiments, processor circuits having features other than those specifically discussed herein with reference to processor circuit 100 may be used.

Memory circuit 50 may be any memory structure, as understood by those of skill in the art. Memory circuit 50 stores at least processing instructions and data. After an instruction and data are received by processor circuit 100, the processor circuit 100 performs operations using the read data based on the read instruction.

Instruction decoder circuit 160 is configured to receive data path instructions from memory circuit 50, where the data path instructions cause data path block circuit 140 to generate a result which is stored in data register files circuit 120. Each data path instruction encodes at least a data path operation to be performed, a register within data register files circuit 120 where the result of the data path operation is to be stored, and one or more registers within data register files circuit 120 which store data to be used as operands for the data path operation. As understood by those of skill in the art, for some data path instructions, the register where the result of the data path operation is to be stored is the same as a register storing data to be used as an operand for the data path operation.

Based on the received data path instructions from memory circuit 50, instruction decoder circuit 160 is configured to generate register signals for data register files circuit 120 which encode one or more registers within which one or more results of one or more data path operations are to be stored, and the one or more registers within data register files circuit 120 which store the data to be used as operands for the one or more data path operations. In addition, based on the received data path instructions from memory circuit 50, instruction decoder circuit 160 is configured to generate operation signals for data path block circuit 140 which encode the one or more operations to be performed.

Data register files circuit 120 is configured to receive the register signals from instruction decoder circuit 160, where the register signals encode the register within which the one or more results of the one or more data path operations are to be stored, and the one or more registers within data register files circuit 120 which store the data to be used as operands for the one or more data path operations.

Based on the received register signals from instruction decoder circuit 160 which encode the one or more registers which store the data to be used as operands for the one or more data path operations, the data register files circuit 120 generates operand data signals for data path block circuit 140. For example, the register signals may identify a particular register file and a particular register within the particular register file for each of the one or more registers storing data to be used as operands for the one or more data path operations. In response to the register signals, the data from the identified particular registers is read and provided to data path block circuit 140 as the operand data signals.

Data path block 140 is configured to receive the operation signals from instruction decoder circuit 160 which encode the one or more data path operations to be performed. In addition, data path block 140 is configured to receive the operand data signals from data register files circuit 120 which encode the data to be used as operands for the one or more data path operations.

Data path block 140 comprises a number of logic circuits, each configured to receive a particular number of data operand signals encoding a number of operands. Each of the logic circuits is also configured to perform a particular data path operation to generate one or more results based on the received operand data signals. For example, data path block 140 may comprise one or more of each of the following logic circuits: shifters, adders, and multipliers. As understood by those of skill in the art, data path block 140 may additionally comprise one or more of each of a number of other logic circuits.

Based on the received operation signals, which encode the one or more data path operations to be performed, data path block 140 selects one or more of the logic circuits. As a result of the selection, the selected logic circuits receive the operand data signals which encode the data to be used as operands for the one or more data path operations.

In response to the operand data signals, the selected logic circuits generate one or more results according to the logic circuitry of the selected logic circuits, as understood by those of skill in the art.

The generated one or more results are provided to data register files circuit 120.

In some embodiments, data path block 140 comprises a number of separate data paths, where each data path comprises a number of each of: shifters, adders, multipliers, and other data path logic circuits. In these embodiments, each data path is used to simultaneously calculate separate results. Accordingly, in these embodiments, the operation signals received by data path block 140 from instruction decoder circuit 160 encode one or more data path operations to be performed with one or more of the separate data paths. In addition, the operand data signals received by data path block 140 from data register files circuit 120 encode the data to be used as operands for the one or more data path operations to be performed with the one or more separate data paths.

The one or more results provided to data register files circuit 120 are written to specified registers within the data register files circuit 120.

As discussed above, data register files circuit 120 is configured to receive register signals from instruction decoder circuit 160. Based on the received register signals which identify the one or more registers to which the one or more results of the one or more data path operations are to be stored, the data register files circuit 120 stores the received one or more results in the identified one or more registers.

In some embodiments, the instruction decoder circuit 160 decodes the one or more data path instructions, the data path block circuit 140 receives the operand data signals from data register files circuit 120 and provides the one or more results to data register files circuit 120, and the one or more results are written to data register files circuit 120 in a single CPU clock cycle. In response to an indication of a new clock cycle, the instruction decoder circuit 160 decodes the one or more data path instructions. In addition, the data path block circuit 140 receives the operation signals from instruction decoder 160, receives the operand data signals from data register files circuit 120, calculates the one or more results, and provides the one or more results to data register files circuit 120, which stores the one or more results in the one or more registers specified in the one or more data path instructions received by instruction decoder circuit 160.

Instruction decoder circuit 160 is also configured to receive memory instructions from memory circuit 50, where the memory instructions cause either data to be read from register files circuit 120 to memory circuit 50 or to be written to register files circuit 120 from memory circuit 50. Each memory instruction encodes at least a memory operation (read from register files circuit 120 or write to register files circuit 120) to be performed, a register within data register files circuit 120 which is read or written, and an address in memory 50.

Based on the received memory instructions from memory circuit 50, instruction decoder circuit 160 is configured to generate register signals for data register files circuit 120 which encode the memory instructions.

Data register files circuit 120 is configured to receive the register signals from instruction decoder circuit 160. Based on the received register signals from instruction decoder circuit 160, the data register files circuit 120 interacts with the memory circuit according to the memory instruction, for example, by reading data from a specified register and writing the read data to memory 50 at a specified address, or by reading data from a specified address in memory 50 and writing the read data to a specified register.

Figure 2:
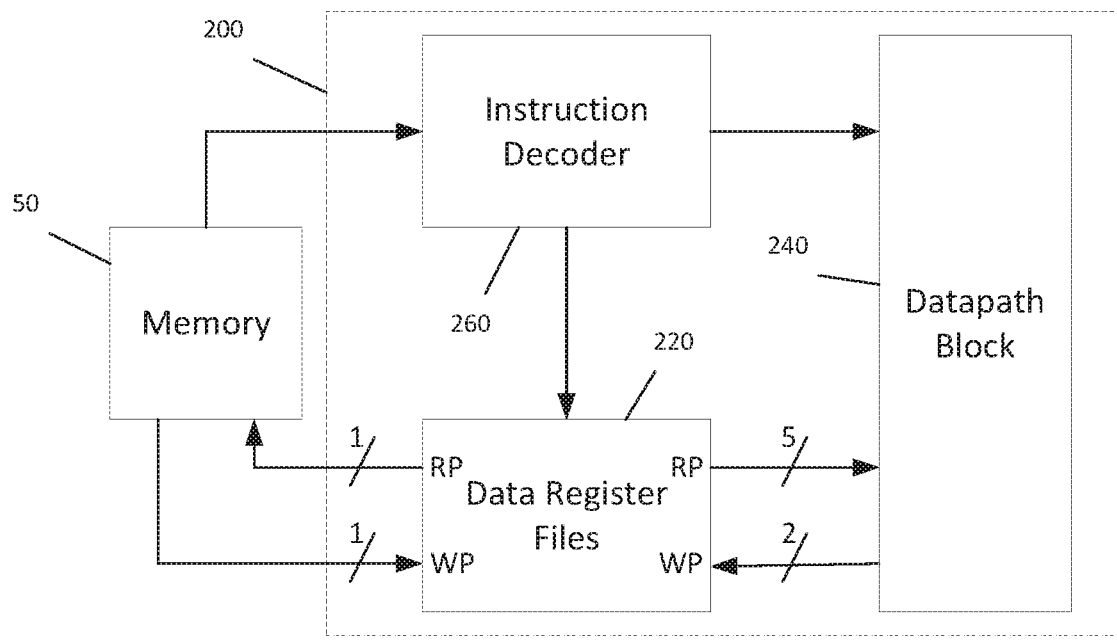
FIG. 2 is a schematic diagram of an embodiment of a processor circuit.

FIG. 2 is a schematic diagram of an embodiment of a processor circuit 200 interfacing with memory 50. Processor circuit 200 includes data register files circuit 220, data path block circuit 240, and instruction decoder circuit 260. As illustrated, in this embodiment, each of the data register files of data register files circuit 220 includes five read ports and two write ports for interfacing with data path block circuit 240, and includes one read port and one write port for interfacing with memory 50. Processor circuit 200 may be used as a portion of a central processing unit (CPU) having other processor circuits known to those of skill in the art. In some embodiments, processor circuits having features other than those specifically discussed herein with reference to processor circuit 200 may be used.

Memory circuit 50 may be any memory structure, as understood by those of skill in the art. Memory circuit 50 stores at least processing instructions and data. After an instruction and data are received by processor circuit 200, the processor circuit 200 performs operations using the read data based on the read instruction.

Instruction decoder circuit 260 is configured to receive data path instructions from memory circuit 50, where the data path instructions cause data path block circuit 240 to generate a result which is stored in data register files circuit 220. Each data path instruction encodes at least a data path operation to be performed, an operation result register within data register files circuit 220 where the result of the data path operation is to be stored, and one or more operand registers within data register files circuit 220 which store data to be used as operands for the data path operation. As understood by those of skill in the art, for some data path instructions, the operation result register where the result of the data path operation is to be stored is the same as an operand register storing data to be used as an operand for the data path operation.

Based on the received data path instructions from memory circuit 50, instruction decoder circuit 260 is configured to generate register signals for data register files circuit 220 which encode the one or more operation result registers within which one or more results of one or more data path operations are to be stored, a write port for each operation result register to be used for writing the one or more results of the one or more data path operations to the one or more operation result registers, the one or more operand registers within data register files circuit 220 which store the data to be used as operands for the one or more data path operations, and a read port for each operand register to be used for reading the operand data therefrom.

In addition, based on the received data path instructions from memory circuit 50, instruction decoder circuit 260 is configured to generate operation signals for data path block circuit 240 which encode the one or more operations to be performed, the write port for each operation result register to be used for writing the one or more results of the one or more data path operations to the one or more operation result registers, and the read port for each operand register to be used for reading the operand data therefrom.

Data register files circuit 220 is configured to receive the register signals from instruction decoder circuit 260 which encode the one or more operation result registers, the write port for each operation result register to be used for writing the one or more results of the one or more data path operations to the one or more operation result registers, the one or more operand registers, and the read port for each operand register to be used for reading the operand data therefrom.

Based on the received register signals from instruction decoder circuit 260 which encode the one or more registers which store the data to be used as operands for the one or more data path operations, the data register files circuit 220 generates operand data signals for data path block circuit 240. For example, the register signals may identify a particular register file and a particular register within the particular register file for each of the one or more registers storing data to be used as operands for the one or more data path operations. In response to the register signals, the data from the identified particular registers is read and provided to data path block circuit 240 as the operand data signals.

Based on the received register signals from instruction decoder circuit 260 which identify the read port for each operand register to be used for reading the operand data therefrom, the data register files circuit 220 reads the data from the identified particular registers and provides the data read to the read ports identified in the received register signals.

Data path block 240 is configured to receive the operation signals from instruction decoder circuit 260 which encode the one or more data path operations to be performed. In addition, data path block 240 is configured to receive the operation signals from instruction decoder circuit 260 which identify the read port for each operand data signal to be used for reading the operand data.

Based on the received operation signals, data path block 240 accesses the identified read ports of data register files circuit 220 to receive the operand data signals which encode the data to be used as operands for the one or more data path operations.

Data path block 240 comprises a number of logic circuits, each configured to receive a particular number of operands. Each of the logic circuits is also configured to perform a particular data path operation to generate one or more results based on the received operand data signals. For example, data path block 240 may comprise one or more of each of the following logic circuits: shifters, adders, and multipliers. As understood by those of skill in the art, data path block 240 may additionally comprise one or more of each of a number of other logic circuits.

Based on the received operation signals, which encode the one or more data path operations to be performed, data path block 240 selects one or more of the logic circuits. As a result of the selection, the selected logic circuits receive the operand data signals which encode the data to be used as operands for the one or more data path operations.

In response to the operand data signals, the selected logic circuits generate one or more results according to the logic circuitry of the selected logic circuits, as understood by those of skill in the art.

The generated one or more results are provided to data register files circuit 220.

In some embodiments, data path block 240 comprises a number of separate data paths, where each data path comprises a number of each of: shifters, adders, multipliers, and other data path logic circuits. In these embodiments, each data path is used to simultaneously calculate separate results. Accordingly, in these embodiments, the operation signals received by data path block 240 from instruction decoder circuit 260 encode one or more data path operations to be performed with one or more of the separate data paths. In addition, the operand data signals received by data path block 240 from data register files circuit 220 encode the data to be used as operands for the one or more data path operations to be performed with the one or more separate data paths.

Based on the received operation signals from instruction decoder circuit 260 which identify the write port for each operation result register to be used for writing the one or more results to the one or more operation result registers of data register files circuit 220, data path block circuit 240 provides the one or more results to the identified one or more write ports of data register files circuit 220.

The one or more results provided to the identified write ports of data register files circuit 220 are written to specified registers within the data register files circuit 220 based on the register signals from instruction decoder 260 which identify the one or more operation result registers within which the one or more results are to be stored, and the write port for each operation result register to be used for the writing.

In some embodiments, the instruction decoder circuit 260 decodes the one or more data path instructions, the data path block circuit 240 receives the operand data signals from data register files circuit 220 and provides the one or more results to data register files circuit 220, and the one or more results are written to data register files circuit 220 in a single CPU clock cycle. In response to an indication of a new clock cycle, the instruction decoder circuit 260 decodes the one or more data path instructions. In addition, the data path block circuit 240 receives the operation signals from instruction decoder 260, receives the operand data signals from data register files circuit 220, calculates the one or more results, and provides the one or more results to data register files circuit 220, which stores the one or more results in the one or more registers specified in the one or more data path instructions received by instruction decoder circuit 260.

Instruction decoder circuit 260 is also configured to receive memory instructions from memory circuit 50, where the memory instructions cause either data to be read from register files circuit 220 to memory circuit 50 or to be written to register files circuit 220 from memory circuit 50. Each memory instruction encodes at least a memory operation (read from register files circuit 220 or write to register files circuit 220) to be performed, a register within data register files circuit 220 which is read or written, and an address in memory 50.

Based on the received memory instructions from memory circuit 50, instruction decoder circuit 260 is configured to generate register signals for data register files circuit 220 which encode the memory instructions.

Data register files circuit 220 is configured to receive the register signals from instruction decoder circuit 260. Based on the received register signals from instruction decoder circuit 260, the data register files circuit 220 interacts with the memory circuit according to the memory instruction, for example, by reading data from a specified register and writing the read data to memory 50 at a specified address, or by reading data from a specified address in memory 50 and writing the read data to a specified register.

Figure 3:
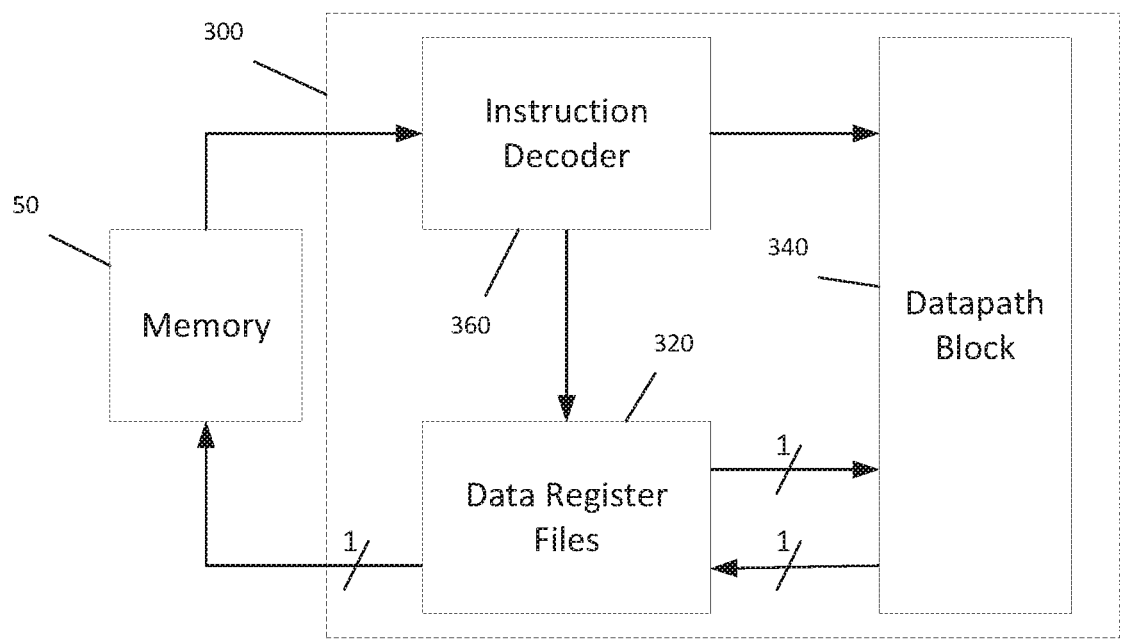
FIG. 3 is a schematic diagram of an embodiment of a processor circuit.

FIG. 3 is a schematic diagram of an embodiment of a processor circuit 300 interfacing with memory 50. Processor circuit 300 includes data register files circuit 320, data path block circuit 340, and instruction decoder circuit 360. As illustrated, in this embodiment, each of the data register files of data register files circuit 320 includes one read port and one write port for interfacing with data path block circuit 340, and includes one write port for interfacing with memory 50. Processor circuit 300 may be used as a portion of a central processing unit (CPU) having other processor circuits known to those of skill in the art. In some embodiments, processor circuits having features other than those specifically discussed herein with reference to processor circuit 300 may be used.

Memory circuit 50 may be any memory structure, as understood by those of skill in the art. Memory circuit 50 stores at least processing instructions and data. After an instruction and data are received by processor circuit 300, the processor circuit 300 performs operations using the read data based on the read instruction.

Instruction decoder circuit 360 is configured to receive data path instructions from memory circuit 50, where the data path instructions cause data path block circuit 340 to generate a result which is stored in data register files circuit 320. Each data path instruction encodes at least a data path operation to be performed, a operation result register within data register files circuit 320 where the result of the data path operation is to be stored, and one or more operand registers within data register files circuit 320 which store data to be used as operands for the data path operation. As understood by those of skill in the art, for some data path instructions, the operation result register where the result of the data path operation is to be stored is the same as an operand register storing data to be used as an operand for the data path operation.

Based on the received data path instructions from memory circuit 50, instruction decoder circuit 360 is configured to generate register signals for data register files circuit 320 which encode the one or more operation result registers within which one or more results of one or more data path operations are to be stored, a write port for each operation result register to be used for writing the one or more results of the one or more data path operations to the one or more operation result registers, the one or more operand registers within data register files circuit 320 which store the data to be used as operands for the one or more data path operations, and a read port for each operand register to be used for reading the operand data therefrom.

In addition, based on the received data path instructions from memory circuit 50, instruction decoder circuit 360 is configured to generate operation signals for data path block circuit 340 which encode the one or more operations to be performed, the write port for each operation result register to be used for writing the one or more results of the one or more data path operations to the one or more operation result registers, and the read port for each operand register to be used for reading the operand data therefrom.

Data register files circuit 320 is configured to receive the register signals from instruction decoder circuit 360 which encode the one or more operation result registers, the write port for each operation result register to be used for writing the one or more results of the one or more data path operations to the one or more operation result registers, the one or more operand registers, and the read port for each operand register to be used for reading the operand data therefrom.

Based on the received register signals from instruction decoder circuit 360 which encode the one or more registers which store the data to be used as operands for the one or more data path operations, the data register files circuit 320 generates operand data signals for data path block circuit 340. For example, the register signals may identify a particular register file and a particular register within the particular register file for each of the one or more registers storing data to be used as operands for the one or more data path operations. In response to the register signals, the data from the identified particular registers is read and provided to data path block circuit 340 as the operand data signals.

Based on the received register signals from instruction decoder circuit 360 which identify the read port for each operand register to be used for reading the operand data therefrom, the data register files circuit 320 reads the data from the identified particular registers and provides the data read to the read ports identified in the received register signals.

Data path block 340 is configured to receive the operation signals from instruction decoder circuit 360 which encode the one or more data path operations to be performed. In addition, data path block 340 is configured to receive the operation signals from instruction decoder circuit 360 which identify the read port for each operand data signal to be used for reading the operand data.

Based on the received operation signals, data path block 340 accesses the identified read ports of data register files circuit 320 to receive the operand data signals which encode the data to be used as operands for the one or more data path operations.

Data path block 340 comprises a number of logic circuits, each configured to receive a particular number of operands. Each of the logic circuits is also configured to perform a particular data path operation to generate one or more results based on the received operand data signals. For example, data path block 340 may comprise one or more of each of the following logic circuits: shifters, adders, and multipliers. As understood by those of skill in the art, data path block 340 may additionally comprise one or more of each of a number of other logic circuits.

Based on the received operation signals, which encode the one or more data path operations to be performed, data path block 340 selects one or more of the logic circuits. As a result of the selection, the selected logic circuits receive the operand data signals which encode the data to be used as operands for the one or more data path operations.

In response to the operand data signals, the selected logic circuits generate one or more results according to the logic circuitry of the selected logic circuits, as understood by those of skill in the art.

The generated one or more results are provided to data register files circuit 320.

In some embodiments, data path block 340 comprises a number of separate data paths, where each data path comprises a number of each of: shifters, adders, multipliers, and other data path logic circuits. In these embodiments, each data path is used to simultaneously calculate separate results. Accordingly, in these embodiments, the operation signals received by data path block 340 from instruction decoder circuit 360 encode one or more data path operations to be performed with one or more of the separate data paths. In addition, the operand data signals received by data path block 340 from data register files circuit 320 encode the data to be used as operands for the one or more data path operations to be performed with the one or more separate data paths.

Based on the received operation signals from instruction decoder circuit 360 which identify the write port for each operation result register to be used for writing the one or more results to the one or more operation result registers of data register files circuit 320, data path block circuit 340 provides the one or more results to the identified one or more write ports of data register files circuit 320.

The one or more results provided to the identified write ports of data register files circuit 320 are written to specified registers within the data register files circuit 320 based on the register signals from instruction decoder circuit 360 which identify the one or more operation result registers within which the one or more results are to be stored, and the write port for each operation result register to be used for the writing. 333

In some embodiments, the instruction decoder circuit 360 decodes the one or more data path instructions, the data path block circuit 340 receives the operand data signals from data register files circuit 320 and provides the one or more results to data register files circuit 320, and the one or more results are written to data register files circuit 320 in a single CPU clock cycle. In response to an indication of a new clock cycle, the instruction decoder circuit 360 decodes the one or more data path instructions. In addition, the data path block circuit 340 receives the operation signals from instruction decoder 360, receives the operand data signals from data register files circuit 320, calculates the one or more results, and provides the one or more results to data register files circuit 320, which stores the one or more results in the one or more registers specified in the one or more data path instructions received by instruction decoder circuit 360.

Instruction decoder circuit 360 is also configured to receive memory instructions from memory circuit 50, where the memory instructions cause data to be read from register files circuit 320 to memory circuit 50. Each memory instruction encodes at least a memory operation (read from register files circuit 320) to be performed, a register within data register files circuit 320 which is read, and an address in memory 50.

Based on the received memory instructions from memory circuit 50, instruction decoder circuit 360 is configured to generate register signals for data register files circuit 320 which encode the memory instructions.

Data register files circuit 320 is configured to receive the register signals from instruction decoder circuit 360. Based on the received register signals from instruction decoder circuit 360, the data register files circuit 320 interacts with the memory circuit according to the memory instruction, for example, by reading data from a specified register and writing the read data to memory 50 at a specified address.

Figure 4:
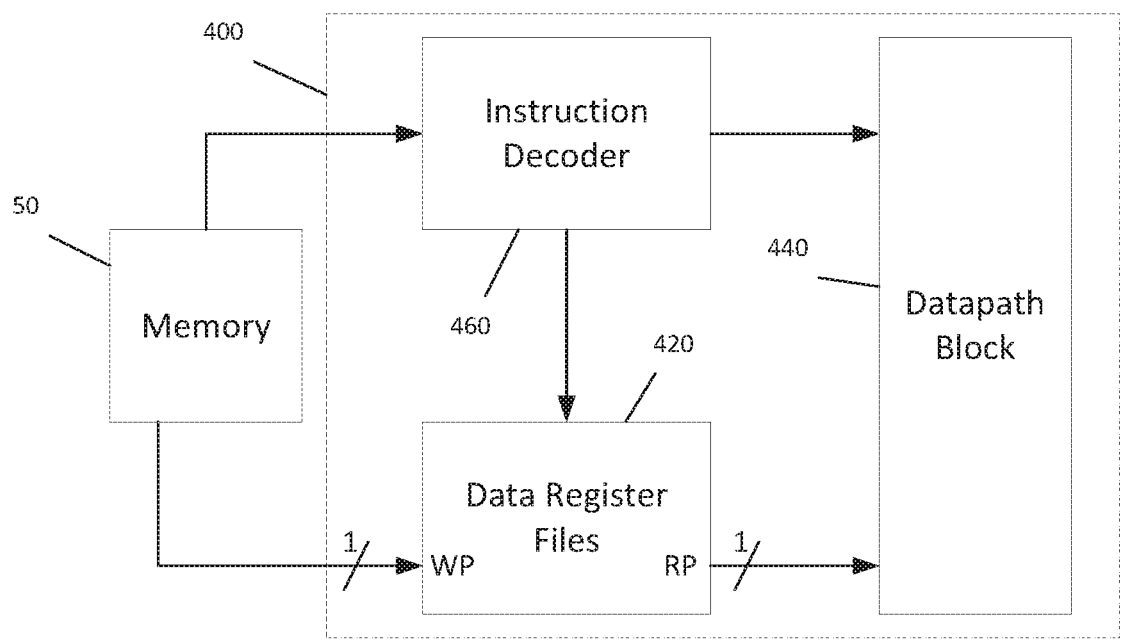
FIG. 4 is a schematic diagram of an embodiment of a processor circuit.

FIG. 4 is a schematic diagram of an embodiment of a processor circuit 400 interfacing with memory 50. Processor circuit 400 includes data register files circuit 420, data path block circuit 440, and instruction decoder circuit 460. As illustrated, in this embodiment, each of the data register files of data register files circuit 420 includes one read port for interfacing with data path block circuit 440, and one write port for interfacing with memory 50. Processor circuit 400 may be used as a portion of a central processing unit (CPU) having other processor circuits known to those of skill in the art. In some embodiments, processor circuits having features other than those specifically discussed herein with reference to processor circuit 400 may be used.

Memory circuit 50 may be any memory structure, as understood by those of skill in the art. Memory circuit 50 stores at least processing instructions and data. After an instruction and data are received by processor circuit 400, the processor circuit 400 performs operations using the read data based on the read instruction.

Instruction decoder circuit 460 is configured to receive data path instructions from memory circuit 50, where the data path instructions cause data path block circuit 440 to generate a result which is stored in data register files circuit 420. Each data path instruction encodes at least a data path operation to be performed, a operation result register within another data register files circuit (not shown) where the result of the data path operation is to be stored, and one or more operand registers within data register files circuit 420 which store data to be used as operands for the data path operation.

Based on the received data path instructions from memory circuit 50, instruction decoder circuit 460 is configured to generate register signals for data register files circuit 420 which encode the one or more operand registers within data register files circuit 420 which store the data to be used as operands for the one or more data path operations, and a read port for each operand register to be used for reading the operand data therefrom.

In addition, based on the received data path instructions from memory circuit 50, instruction decoder circuit 460 is configured to generate operation signals for data path block circuit 440 which encode the one or more operations to be performed, the write port for each operation result register to be used for writing the one or more results of the one or more data path operations to the one or more operation result registers, and the read port for each operand register to be used for reading the operand data therefrom.

Data register files circuit 420 is configured to receive the register signals from instruction decoder circuit 460 which encode the one or more operand registers, and the read port for each operand register to be used for reading the operand data therefrom.

Based on the received register signals from instruction decoder circuit 460 which encode the one or more registers which store the data to be used as operands for the one or more data path operations, the data register files circuit 420 generates operand data signals for data path block circuit 440. For example, the register signals may identify a particular register file and a particular register within the particular register file for each of the one or more registers storing data to be used as operands for the one or more data path operations. In response to the register signals, the data from the identified particular registers is read and provided to data path block circuit 440 as the operand data signals.

Based on the received register signals from instruction decoder circuit 460 which identify the read port for each operand register to be used for reading the operand data therefrom, the data register files circuit 420 reads the data from the identified particular registers and provides the data read to the read ports identified in the received register signals.

Data path block 440 is configured to receive the operation signals from instruction decoder circuit 460 which encode the one or more data path operations to be performed. In addition, data path block 440 is configured to receive the operation signals from instruction decoder circuit 460 which identify the read port for each operand data signal to be used for reading the operand data.

Based on the received operation signals, data path block 440 accesses the identified read ports of data register files circuit 420 to receive the operand data signals which encode the data to be used as operands for the one or more data path operations.

Data path block 440 comprises a number of logic circuits, each configured to receive a particular number of operands. Each of the logic circuits is also configured to perform a particular data path operation to generate one or more results based on the received operand data signals. For example, data path block 440 may comprise one or more of each of the following logic circuits: shifters, adders, and multipliers. As understood by those of skill in the art, data path block 440 may additionally comprise one or more of each of a number of other logic circuits.

Based on the received operation signals, which encode the one or more data path operations to be performed, data path block 440 selects one or more of the logic circuits. As a result of the selection, the selected logic circuits receive the operand data signals which encode the data to be used as operands for the one or more data path operations.

In response to the operand data signals, the selected logic circuits generate one or more results according to the logic circuitry of the selected logic circuits, as understood by those of skill in the art.

The generated one or more results are provided to data register files circuit 420.

In some embodiments, data path block 440 comprises a number of separate data paths, where each data path comprises a number of each of: shifters, adders, multipliers, and other data path logic circuits. In these embodiments, each data path is used to simultaneously calculate separate results. Accordingly, in these embodiments, the operation signals received by data path block 440 from instruction decoder circuit 460 encode one or more data path operations to be performed with one or more of the separate data paths. In addition, the operand data signals received by data path block 440 from data register files circuit 420 encode the data to be used as operands for the one or more data path operations to be performed with the one or more separate data paths.

Based on the received operation signals from instruction decoder circuit 460 which identify the write port for each operation result register to be used for writing the one or more results to the one or more operation result registers (not shown), data path block circuit 440 provides the one or more results to the identified one or more write ports.

The one or more results provided to the identified write ports of the other data register files circuit (not shown) are written to the identified operation result registers.

In some embodiments, the instruction decoder circuit 460 decodes the one or more data path instructions, the data path block circuit 440 receives the operand data signals from data register files circuit 420 and provides the one or more results to data register files circuit 420, and the one or more results are written to data register files circuit 420 in a single CPU clock cycle. In response to an indication of a new clock cycle, the instruction decoder circuit 460 decodes the one or more data path instructions. In addition, the data path block circuit 440 receives the operation signals from instruction decoder 460, receives the operand data signals from data register files circuit 420, calculates the one or more results, and provides the one or more results to data register files circuit 420, which stores the one or more results in the one or more registers specified in the one or more data path instructions received by instruction decoder circuit 460.

Instruction decoder circuit 460 is also configured to receive memory instructions from memory circuit 50, where the memory instructions cause data to be written to register files circuit 420 from memory circuit 50. Each memory instruction encodes at least a memory operation (write to register files circuit 420) to be performed, a register within data register files circuit 420 which is written, and an address in memory 50.

Based on the received memory instructions from memory circuit 50, instruction decoder circuit 460 is configured to generate register signals for data register files circuit 420 which encode the memory instructions.

Data register files circuit 420 is configured to receive the register signals from instruction decoder circuit 460. Based on the received register signals from instruction decoder circuit 460, the data register files circuit 420 interacts with the memory circuit according to the memory instruction, for example, by reading data from a specified address in memory 50 and writing the read data to a specified register.

Figure 5:
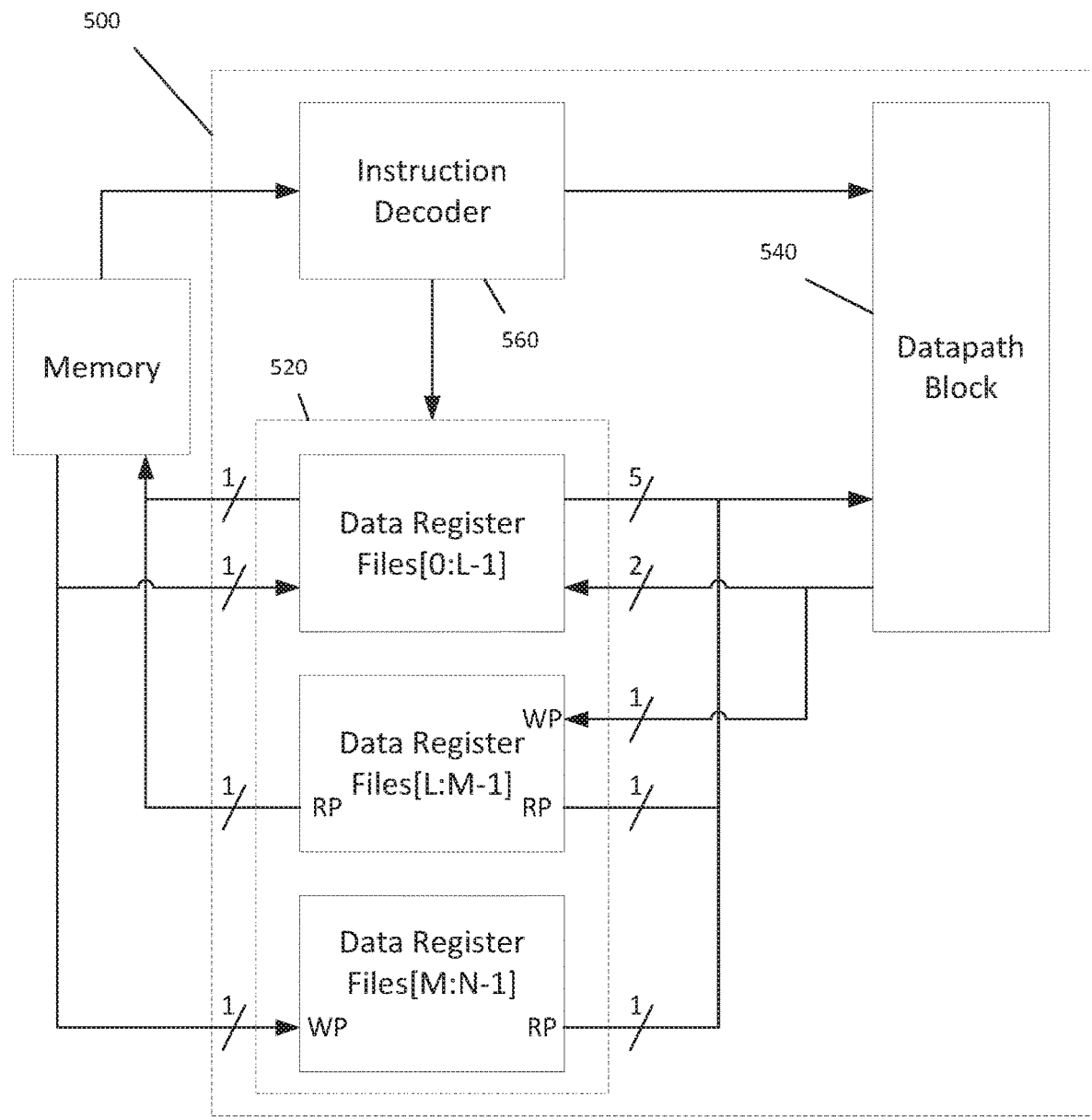
FIG. 5 is a schematic diagram of an embodiment of a processor circuit.

FIG. 5 is a schematic diagram of an embodiment of a processor circuit 500 interfacing with memory 50. Processor circuit 500 includes data register files circuit 520, data path block circuit 540, and instruction decoder circuit 560. As illustrated, in this embodiment, each of the data register files of data register files circuit 520 includes one of:

five read ports and two write ports for interfacing with data path block circuit 540, and one read port and one write port for interfacing with memory 50;

one read port and one write port for interfacing with data path block circuit 540, and one read port for interfacing with memory 50; and one read port for interfacing with data path block circuit 540, and one write port for interfacing with memory 50.

In other embodiments, register files having other numbers of ports interfacing with data path block circuit 140 may be used. In other embodiments, register files having other numbers of ports interfacing with memory 50 may be used. Processor circuit 500 may be used as a portion of a central processing unit (CPU) having other processor circuits known to those of skill in the art. In some embodiments, processor circuits having features other than those specifically discussed herein with reference to processor circuit 500 may be used.

The registers of data register files having five read ports and two write ports for interfacing with data path block circuit 540, and one read port and one write port for interfacing with memory 50 may, for example, be used as general purpose registers.

The registers of data register files having one read port and one write port for interfacing with data path block circuit 540, and one read port for interfacing with memory 50, may, for example, be used as operation result registers, which store results of calculation operations, where the results may be stored in memory 50. In some embodiments, data register files having one read port and one write port for interfacing with data path block circuit 540, and one read port for interfacing with memory 50, may, for example, be used for other data.

The registers of data register files having one read port for interfacing with data path block circuit 540, and one write port for interfacing with memory 50, may, for example be used as constant registers, which store constants, which do not change for a number of data path instructions. For example, a group of data path instructions may be associated with a loop in the source code compiled to generate the data path instructions, and constant registers may be used to store values of constants which do not change during the execution of the data path instructions associated with the loop.

In some embodiments, one or more register files has one read port and one write port for interfacing with data path block circuit 140, and one write port for interfacing with memory 50.

In some embodiments, one or more register files has one write port for interfacing with data path block circuit 140, and one read port for interfacing with memory 50.

Memory circuit 50 may be any memory structure, as understood by those of skill in the art. Memory circuit 50 stores at least processing instructions and data. After an instruction and data are received by processor circuit 500, the processor circuit 500 performs operations using the read data based on the read instruction.

Instruction decoder circuit 560 is configured to receive data path instructions from memory circuit 50, where the data path instructions cause data path block circuit 540 to generate a result which is stored in data register files circuit 520. Each data path instruction encodes at least a data path operation to be performed, a operation result register within data register files circuit 520 where the result of the data path operation is to be stored, and one or more operand registers within data register files circuit 520 which store data to be used as operands for the data path operation. As understood by those of skill in the art, for some data path instructions, the operation result register where the result of the data path operation is to be stored is the same as an operand register storing data to be used as an operand for the data path operation.

Based on the received data path instructions from memory circuit 50, instruction decoder circuit 560 is configured to generate register signals for data register files circuit 520 which encode the one or more operation result registers within which one or more results of one or more data path operations are to be stored, a write port for each operation result register to be used for writing the one or more results of the one or more data path operations to the one or more operation result registers, the one or more operand registers within data register files circuit 520 which store the data to be used as operands for the one or more data path operations, and a read port for each operand register to be used for reading the operand data therefrom.

In addition, based on the received data path instructions from memory circuit 50, instruction decoder circuit 560 is configured to generate operation signals for data path block circuit 540 which encode the one or more operations to be performed, the write port for each operation result register to be used for writing the one or more results of the one or more data path operations to the one or more operation result registers, and the read port for each operand register to be used for reading the operand data therefrom.

Data register files circuit 520 is configured to receive the register signals from instruction decoder circuit 560 which encode the one or more operation result registers, the write port for each operation result register to be used for writing the one or more results of the one or more data path operations to the one or more operation result registers, the one or more operand registers, and the read port for each operand register to be used for reading the operand data therefrom.

Based on the received register signals from instruction decoder circuit 560 which encode the one or more registers which store the data to be used as operands for the one or more data path operations, the data register files circuit 520 generates operand data signals for data path block circuit 540. For example, the register signals may identify a particular register file and a particular register within the particular register file for each of the one or more registers storing data to be used as operands for the one or more data path operations. In response to the register signals, the data from the identified particular registers is read and provided to data path block circuit 540 as the operand data signals.

Based on the received register signals from instruction decoder circuit 560 which identify the read port for each operand register to be used for reading the operand data therefrom, the data register files circuit 520 reads the data from the identified particular registers and provides the data read to the read ports identified in the received register signals.

Data path block 540 is configured to receive the operation signals from instruction decoder circuit 560 which encode the one or more data path operations to be performed. In addition, data path block 540 is configured to receive the operation signals from instruction decoder circuit 560 which identify the read port for each operand data signal to be used for reading the operand data.

Based on the received operation signals, data path block 540 accesses the identified read ports of data register files circuit 520 to receive the operand data signals which encode the data to be used as operands for the one or more data path operations.

Data path block 540 comprises a number of logic circuits, each configured to receive a particular number of operands. Each of the logic circuits is also configured to perform a particular data path operation to generate one or more results based on the received operand data signals. For example, data path block 540 may comprise one or more of each of the following logic circuits: shifters, adders, and multipliers. As understood by those of skill in the art, data path block 540 may additionally comprise one or more of each of a number of other logic circuits.

Based on the received operation signals, which encode the one or more data path operations to be performed, data path block 540 selects one or more of the logic circuits. As a result of the selection, the selected logic circuits receive the operand data signals which encode the data to be used as operands for the one or more data path operations.

In response to the operand data signals, the selected logic circuits generate one or more results according to the logic circuitry of the selected logic circuits, as understood by those of skill in the art.

The generated one or more results are provided to data register files circuit 520.

In some embodiments, data path block 540 comprises a number of separate data paths, where each data path comprises a number of each of: shifters, adders, multipliers, and other data path logic circuits. In these embodiments, each data path is used to simultaneously calculate separate results. Accordingly, in these embodiments, the operation signals received by data path block 540 from instruction decoder circuit 560 encode one or more data path operations to be performed with one or more of the separate data paths. In addition, the operand data signals received by data path block 540 from data register files circuit 520 encode the data to be used as operands for the one or more data path operations to be performed with the one or more separate data paths.

Based on the received operation signals from instruction decoder circuit 560 which identify the write port for each operation result register to be used for writing the one or more results to the one or more operation result registers of data register files circuit 520, data path block circuit 540 provides the one or more results to the identified one or more write ports of data register files circuit 520.

The one or more results provided to the identified write ports of data register files circuit 520 are written to specified registers within the data register files circuit 520 based on the register signals from instruction decoder 560 which identify the one or more operation result registers within which the one or more results are to be stored, and the write port for each operation result register to be used for the writing.

In some embodiments, the instruction decoder circuit 560 decodes the one or more data path instructions, the data path block circuit 540 receives the operand data signals from data register files circuit 520 and provides the one or more results to data register files circuit 520, and the one or more results are written to data register files circuit 520 in a single CPU clock cycle. In response to an indication of a new clock cycle, the instruction decoder circuit 560 decodes the one or more data path instructions. In addition, the data path block circuit 540 receives the operation signals from instruction decoder 560, receives the operand data signals from data register files circuit 520, calculates the one or more results, and provides the one or more results to data register files circuit 520, which stores the one or more results in the one or more registers specified in the one or more data path instructions received by instruction decoder circuit 560.

Instruction decoder circuit 560 is also configured to receive memory instructions from memory circuit 50, where the memory instructions cause either data to be read from register files circuit 520 to memory circuit 50 or to be written to register files circuit 520 from memory circuit 50. Each memory instruction encodes at least a memory operation (read from register files circuit 520 or write to register files circuit 520) to be performed, a register within data register files circuit 520 which is read or written, and an address in memory 50.

Based on the received memory instructions from memory circuit 50, instruction decoder circuit 560 is configured to generate register signals for data register files circuit 520 which encode the memory instructions.

Data register files circuit 520 is configured to receive the register signals from instruction decoder circuit 560. Based on the received register signals from instruction decoder circuit 560, the data register files circuit 520 interacts with the memory circuit according to the memory instruction, for example, by reading data from a specified register and writing the read data to memory 50 at a specified address, or by reading data from a specified address in memory 50 and writing the read data to a specified register.

Figure 6:
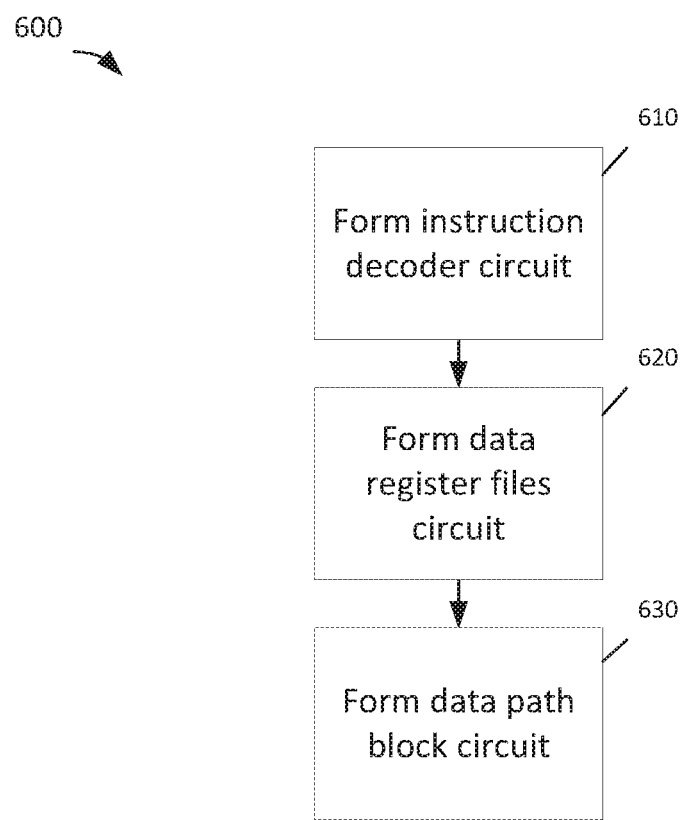
FIG. 6 is a flowchart diagram illustrating a method of making a processor circuit.

FIG. 6 is a flowchart diagram illustrating a method 600 of making a processor circuit.

At 610, an instruction decoder circuit is formed on a first substrate. The instruction decoder circuit may have features similar or identical to any of instruction decoder circuits 160, 260, 360, 460, and 560, discussed above with reference to FIGS. 1-5.

At 620, a data register files circuit is formed on the first substrate or on a second substrate. The data register file circuit may have features similar or identical to any of the data register file circuits 120, 220, 320, 420, and 520, discussed above with reference to FIGS. 1-5. At 620, the data register files circuit is also electrically connected with the instruction decoder circuit. The electrical connections formed may be similar or identical to those schematically illustrated in FIGS. 1-5.

At 630, a data path block circuit is formed on the first substrate, the second substrate, or a third substrate. The data path block circuit may have features similar or identical to any of the data path block circuits 140, 240, 340, 440, and 540, discussed above with reference to FIGS. 1-5. At 630, the data path block circuit is also electrically connected with the instruction decoder circuit and the data register file circuit. The electrical connections formed may be similar or identical to those schematically illustrated in FIGS. 1-5.

In some embodiments, the order of 610, 620, and 630 is different than that shown in the illustrated embodiment. In some embodiments, 610, 620, and 630 are performed substantially simultaneously, for example, as part of a semiconductor integrated circuit fabrication process.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A processor circuit, comprising:
    a data path block circuit configured to perform any of a plurality of data path operations to generate one or more results based on first and second operands;
    a data register files circuit, comprising:
        a first register file, wherein the first register file comprises:
            a first plurality of registers, and
            a first quantity of read and write ports, and
        a second register file, wherein the second register file comprises:
            a second plurality of registers, and
            a second quantity of read and write ports,
        wherein the first quantity of read and write ports is different from the second quantity of read and write ports; and
    an instruction decoder circuit configured to provide an operation signal to the data path block circuit, wherein the operation signal identifies a particular data path operation to be performed by the data path block circuit and identifies one or more read ports of the data register files circuit for retrieving data encoding the first and second operands.

2. The processor circuit of claim 1, wherein, in response to the operation signal, the data path block circuit is configured to retrieve first and second operand data signals from the identified read ports, wherein the first and second operand data signals respectively encode the first and second operands.

3. The processor circuit of claim 1, wherein, in response to the operation signal, the data path block circuit is configured to perform the identified particular data path operation on the first and second operands to generate the one or more results.

4. The processor circuit of claim 3, wherein the operation signal identifies one or more write ports, and wherein the data path block circuit is configured to provide the one or more results to the identified write ports.

5. The processor circuit of claim 1, wherein the instruction decoder circuit is configured to receive a data path instruction from a memory, wherein the data path instruction encodes the particular data path operation, one or more operation result registers within the data register files circuit where the one or more results of the particular data path operation are to be stored, and first and second operand registers within the data register files circuit which store data to be used as the first and second operands.

6. The processor circuit of claim 5, wherein the first operand is in the first register file and the second operand is in the second register file.

7. The processor circuit of claim 5, wherein at least one of the one or more operation result registers is in the first register file, and at least one of the first operand register and the second operand register is in the second register file.

8. The processor circuit of claim 5, wherein the instruction decoder circuit is configured to provide a register signal for the data register files circuit, wherein the register signal identifies the one or more operation result registers, one or more write ports for the one or more operation result registers, the first and second operand registers, and first and second read ports for the first and second operand registers.

9. The processor circuit of claim 8, wherein, based on the register signal, the data register files circuit is configured to provide data stored in the first and second operand registers to the first and second read ports.

10. The processor circuit of claim 8, wherein, based on the register signal, the data register files circuit is configured to read data from the one or more write ports for the one or more operation result registers to the one or more operation result registers.

11. A method of making a processor circuit, the method comprising:
    forming a data path block circuit, wherein the data path block circuit is configured to perform any of a plurality of data path operations to generate one or more results based on first and second operands;
    forming a data register files circuit, by:
        forming a first register file, wherein the first register file comprises:
            a first plurality of registers, and
            a first quantity of read and write ports, and
        forming a second register file, wherein the second register file comprises:
            a second plurality of registers, and
            a second quantity of read and write ports,
        wherein the first quantity of read and write ports is different from the second quantity of read and write ports; and
    forming an instruction decoder circuit configured to provide an operation signal to the data path block circuit, wherein the operation signal identifies a particular data path operation to be performed by the data path block circuit and identifies one or more read ports of the data register files circuit for retrieving data encoding the first and second operands.

12. The method of claim 11, wherein, in response to the operation signal, the data path block circuit is configured to retrieve first and second operand data signals from the identified read ports, wherein the first and second operand data signals respectively encode the first and second operands.

13. The method of claim 11, wherein, in response to the operation signal, the data path block circuit is configured to perform the identified particular data path operation on the first and second operands to generate the one or more results.

14. The method of claim 13, wherein the operation signal identifies one or more write ports, and wherein the data path block circuit is configured to provide the one or more results to the identified write ports.

15. The method of claim 11, wherein the instruction decoder circuit is configured to receive a data path instruction from a memory, wherein the data path instruction encodes the particular data path operation, one or more operation result registers within the data register files circuit where the one or more results of the particular data path operation are to be stored, and first and second operand registers within the data register files circuit which store data to be used as the first and second operands.

16. The method of claim 15, wherein the first operand is in the first register file and the second operand is in the second register file.

17. The method of claim 15, wherein at least one of the one or more operation result registers is in the first register file, and at least one of the first operand register and the second operand register is in the second register file.

18. The method of claim 15, wherein the instruction decoder circuit is configured to provide a register signal for the data register files circuit, wherein the register signal identifies the one or more operation result registers, one or more write ports for the one or more operation result registers, the first and second operand registers, and first and second read ports for the first and second operand registers.

19. The method of claim 18, wherein, based on the register signal, the data register files circuit is configured to provide data stored in the first and second operand registers to the first and second read ports.

20. The method of claim 18, wherein, based on the register signal, the data register files circuit is configured to read data from the one or more write ports for the one or more operation result registers to the one or more operation result registers.

* * * * *